United States Patent [19]

Gregorek et al.

[11] Patent Number: 5,321,740

[45] Date of Patent: Jun. 14, 1994

[54] TELEPHONE MARKETING SYSTEM

[75] Inventors: Mark R. Gregorek, Mahwah; Jeffrey C. Dillow, Sparta, both of N.J.

[73] Assignee: Quantum Systems, Inc., Mahwah, N.J.

[21] Appl. No.: 718,080

[22] Filed: Jun. 20, 1991

[51] Int. Cl.[5] .................. H04M 3/22; H04M 3/42
[52] U.S. Cl. ................................. 379/67; 379/88; 379/96; 379/257; 379/381
[58] Field of Search ................. 379/67, 87, 257, 374, 379/82, 84, 88, 201, 372, 96, 381

[56] References Cited

U.S. PATENT DOCUMENTS

| | | | |
|---|---|---|---|
| 1,958,896 | 5/1934 | Lesavoy et al. | 379/84 |
| 3,165,590 | 1/1965 | Brooks et al. | 379/252 |
| 3,482,057 | 12/1969 | Abbott et al. | 379/67 |
| 3,700,813 | 10/1972 | Colman | 379/357 |
| 4,255,621 | 3/1981 | Marheine | 379/67 |
| 4,277,649 | 7/1981 | Sheinbein | 379/201 |
| 4,451,704 | 5/1984 | Winkelman | 379/67 |
| 4,510,349 | 4/1985 | Segre-Amar | 379/87 |
| 4,720,848 | 1/1988 | Akiyama | 379/88 |
| 4,809,321 | 2/1989 | Morganstein et al. | 379/211 |
| 4,811,382 | 3/1989 | Sleevi | 379/67 |
| 4,850,007 | 7/1989 | Marino et al. | 379/67 |
| 4,910,762 | 3/1990 | Blom | 379/67 |
| 4,932,042 | 6/1990 | Baral et al. | 379/67 |

FOREIGN PATENT DOCUMENTS

| | | | |
|---|---|---|---|
| 1198843 | 12/1985 | Canada | 379/88 |
| 3306313 | 8/1984 | Fed. Rep. of Germany | 379/88 |
| 57-87661 | 6/1982 | Japan | 379/257 |
| 58-108855 | 6/1983 | Japan | 379/88 |
| 2170377 | 7/1986 | United Kingdom | 379/88 |

OTHER PUBLICATIONS

"Scanning schemes in electronic telephone systems", Y. Jayachandra, *Telephony*, Nov. 20, 1978, pp. 40, 41, 44 [379/384].

*Primary Examiner*—Thomas W. Brown
*Attorney, Agent, or Firm*—Panitch, Schwarze, Jacobs & Nadel

[57] ABSTRACT

A marketing system selectively modifies an existing telephone network by modifying a portion of the call processing software of the existing telephone network and by replacing at least a portion of an audible call progress signal generated by the telephone network by a prerecorded announcement. A calling party places a telephone call at a first telephone to a second telephone having a particular calling status. Once the call is made, a switch or an associated network signaling system determines the busy/idle status of the second telephone. In place of the usual ringback or busy signal, an announcement indicates to the calling party the status of the second telephone and a series of announcements are played for a predetermined period of time. During the announcements, the system continues to determine the status of the telephone line of the second telephone. The announcements are played until the call is completed or abandoned.

11 Claims, 7 Drawing Sheets

TELEPHONE MARKETING SYSTEM

BACKGROUND OF THE INVENTION

The present invention relates to a telephone marketing system and, more particularly, to a telephone marketing system for selectively modifying an existing telephone network by replacing at least a portion of an audible call progress signal generated by the telephone network by a prerecorded announcement and by modifying a portion of the existing call processing software of the telephone network.

Most conventional telephone networks provide a calling party with an audible ringback signal when an intended called party's telephone line is idle, and a busy signal when the intended called party's telephone line is already occupied, i.e., the telephone of the called station. Many calling parties become frustrated when encountering a busy signal, especially since the tone used to signify a busy signal is normally annoying. The time a calling party remains on the line and attempts to redial the telephone called station is busy normally represents wasted time and occupies phone equipment without generating income. It would be beneficial to be able to productively occupy the time that the calling party is on the phone line without annoying the calling party by requiring the calling party to listen to a busy signal.

Likewise, when the called station's line is idle, the period of time in which a calling party remains on the line while waiting for a party to answer the phone can be considered to be wasted time and money.

It would be advantageous to have a telephone system which would replace the audible ringback and busy signals initiated by the conventional telephone network by a series of prerecorded announcements which would provide the calling party with useful information. When the telephone at the called station is answered, the announcements would discontinue and the call would be connected in the usual manner. In addition, the announcements are also discontinued if the calling party abandons the call.

The present invention is directed to a telephone marketing system which is capable of replacing a busy signal or audible ringback signal by one or more prerecorded announcements. The present telephone marketing system notifies the calling party that the line is either busy or idle and, if busy, that the line will be automatically retried for completion in a predetermined amount of time. If the line is idle one or more prerecorded announcements are played for the caller, the announcements continuing until the phone at the called station is answered. At that time, the announcements are discontinued and the call is completed. If the called station's line is busy, a number of prerecorded announcements are played for the predetermined amount of time. The announcements can vary in subject matter. Once the called station's line is determined to be idle, i.e., at the called station is no longer in use the telephone, the calling party is automatically connected to the called station and the announcements are terminated.

SUMMARY OF THE INVENTION

Briefly stated, the present invention is directed to a marketing system for selectively modifying an existing telephone network by modifying a portion of the call processing software of the existing telephone network and by replacing at least a portion of an audible call progress signal generated by the telephone network by a prerecorded announcement. The marketing system comprises means for placing a telephone call by a calling party at a first telephone, means for connecting the telephone call to an identified called party at a second telephone having a particular calling status, means for determining the busy/idle status of the second telephone, and means for playing at least one announcement to the calling party for a predetermined period of time during a time period when an audible call progress signal would have been produced.

BRIEF DESCRIPTION OF THE DRAWINGS

The foregoing summary, as well as the following detailed description of a preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DETAILED DESCRIPTION OF THE PREFERRED EMBODIMENTS

Figure 1:
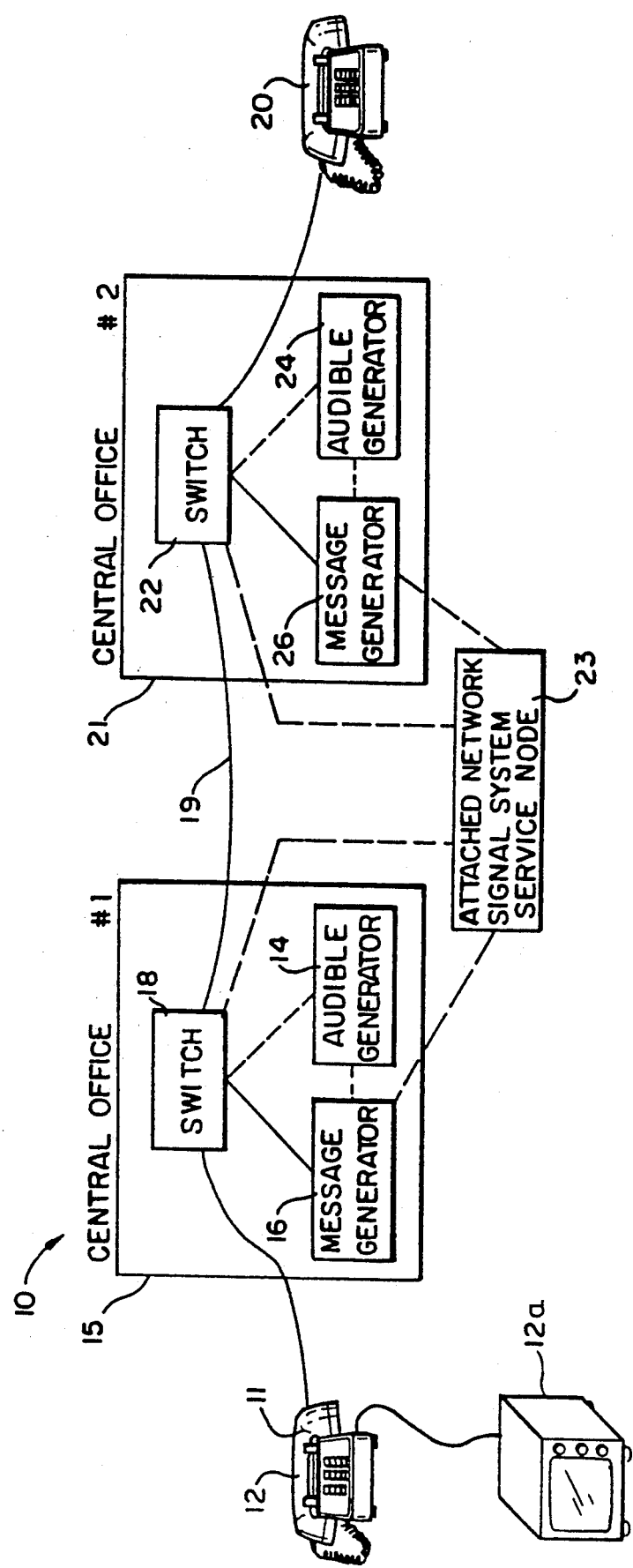
FIG. 1 is a block diagram of a telephone marketing system in accordance with the present invention.

Referring to the drawings wherein like numerals indicate like elements throughout, there is shown in FIG. 1 a schematic block diagram of a telephone marketing system 10 in accordance with the present invention. With the system 10, a calling party places a call at a first location by means of a conventional telephone 12 such as, but not limited to, a rotary dial or touch tone telephone instrument well known in the art. The telephone 12 could also be connected to a video display terminal 12a for transmission of video signals, such as a computer terminal, video telephone or telephone monitor. It is to be understood by those skilled in the art that the telephone marketing system 10 is not limited to a conventional telephone system. The telephone marketing system 10 can be used with any state of the art communication system.

As is well known in the art, when the calling party removes the handset 11 from the base of the telephone 12, a connection is formed with a first local central office 15, which is usually associated with a local telephone company. The first local central office 15 transmits a dial tone back to the first telephone 12. The telephone number dialed or otherwise entered by the calling party into the telephone 12 is transmitted to the local central office 15 as a series of signals which are detected by a computerized switch 18 located within the first central office 15. The switch 18 is responsible for determining the destination of the call based upon the transmitted signals. The switch 18 transmits the call initiated by the calling party over the telephone network 19 toward an identified called station at a second telephone 20. The called station is identified by the telephone number entered by the calling party at the first telephone 12. In the preferred embodiment, the telephone network 19 is a local exchange network, however, the telephone network 19 could also be an interexchange or long distance network. It is also possible to have the calling party and the called station served by the same switch.

The call from the calling party is received by a second computerized switch 22 located at a second local central office 21 which determines if the second telephone 20 is in a busy or an idle state. An attached network signaling system 23 can also determine busy/idle status of the called station. The specific procedures by which a switch or an attached network signaling system determines the busy/idle status of the called station is well-known to those skilled in the art and will not be discussed further.

The switch 18 is connected to an audible generator or audible signal generator 14 which is capable of generating an audible ringback signal if the called station's line is idle, i.e., the called station is not using the telephone 20, or a busy signal if the called station's line is busy, i.e., the telephone 20 is in use. As will be discussed hereinafter, the switch 22 or an attached network signaling system (ANSS) 23 determines the status of the telephone 20 of the called station and instructs the audible signal generator 24 or notifies switch 18 to instruct the audible signal generator 14 to transmit the proper call progress signal, i.e., either an audible ringback or a busy signal. The audible signal generator 14 is of a type well known in the telephone art and therefore will not be discussed further. The second switch 22 is connected to a conventional second audible signal generator 24. Depending on the configuration of the telephone network, either audible signal generator 14 or 24 can transmit the proper signal to telephone 12.

A message generator 16 is also connected to the switch 18 and is capable of supplementing and/or replacing the signals generated by the audible signal generator 14. The switch 18 or an attached network signaling system 23 determines whether the audible signal generator 14 or the message generator 16 is activated as discussed hereinafter. For purposes of discussion, audible signal generator 14 and message generator 16 will be assumed to be providing signals and/or announcements to telephone 12. As with the first audible signal generator 14, the second audible signal generator 24 is connected to a second switch 22 as is message generator 26 which is similar to the first message generator 16. Message generators 16 and 26 can alternatively be located at an attached signaling system service node location.

Announcements are enabled by inserting a software subroutine into the call processing software of the telephone network. It is well-known to those in the art the various ways the software can be incorporated into the call processing system of the telephone network and will not be discussed further. This subroutine causes call processing procedures to be modified and allows the message generator 16 to become an integral part of the call completion sequence, The switch 22 or the ANSS 23 first determines the initial busy/idle status of the telephone 20. On a busy condition, the switch 22 or the ANSS 23 suspends call processing for a predetermined period of time. Simultaneously, the switch 22 or ANSS 23 signals message generator 16 to initiate an announcement sequence. After the predetermined period of time, the switch 22 or the ANSS 23 rechecks the busy/idle status of the telephone 20 and then communicates the status to the message generator 16. The software subroutine is designed to allow for regular checking of busy/idle status as long as the calling party does not abandon the call and for two way communication with the message generator 16.

If the second telephone 20 is idle, i.e., the telephone is not being used, the second switch 22 or the ANSS 23 can either activate the audible signal generator 14 to produce a conventional audible ringback signal or can activate the message generator 16 to play a series of prerecorded announcements to the calling party for a predetermined period of time. Message generator 16 is also capable of producing a conventional audible ringback signal in place of audible signal generator 14. In either case, the resulting message or audible ringback indicates to the calling party that the second telephone 20 is not currently in use. If the second telephone 20 is busy, i.e., a party is currently using the telephone 20, the second switch 22 or an ANSS 23 can either activate the audible signal generator 14 to generate a busy signal or activate the message generator 16 to play a series of prerecorded announcements to the calling party at intervals for a predetermined period of time while periodically checking to determine if the called station is still busy. Message generator 16 is also capable of producing conventional busy signals in place of audible signal generator 14. The resulting message and/or busy signal indicates to the calling party at the first telephone 12 that the called station is busy and if a message is played, indicates that the system will automatically retry to make the connection to the second telephone 20 within a predetermined period of time. A possible time frame for retrying to make the connection to the second telephone 20 is every 15 seconds; however, it is to be understood by those skilled in the art that any other suitable time frame including a variable time frame could be used.

In the preferred embodiment, the marketing system 10 selects the type of announcements which are played to the calling party. The marketing system 10 can also determine when a particular announcement is to be played based on a number of criteria or factors, such as, but not limited to, time of day, day of week, month of year, or area code and/or telephone exchange of calling party. When a calling party initiates a call to the second telephone 20, the message generator 16 can use an automatic number identification (ANI) system or equivalent which is well-known in the art to identify the area code and telephone number of the calling party.

If the message generator is set to determine which announcements are to be played based upon the area code and telephone number of the calling party, the message generator 16 can read the telephone number of the calling party as provided by the telephone network and determine the geographical location of the calling party by matching up the telephone number with a location provided by a look up table located in the memory (not shown) of the message generator 16. The message generator 16 determines which announcements are designated for that particular area code and telephone exchange and plays the prerecorded messages in a predetermined segment of time until the telephone 20 is answered or until the calling party abandons the call.

The message generator 16 can also play certain messages based on the time of day, day of week, month of year or any other time frame reference. A clock (not shown) located within the message generator 16 monitors the time of day, day of week, day of month, month of year and year. When a call is placed to the second telephone 20 by the calling party, and the message generator 16 has been signaled to initiate a message sequence, the information from the clock is read by the message generator 16 and is compared to information located in a look up table in the memory of the message generator 16 to determine which messages are to be played. The message generator 16 continually retrieves the designated messages in predetermined segments of time until the telephone 20 is answered or the calling party abandons the call. It should be appreciated that, if desired, live announcements may be provided under control of the message generator 16.

Figure 2:
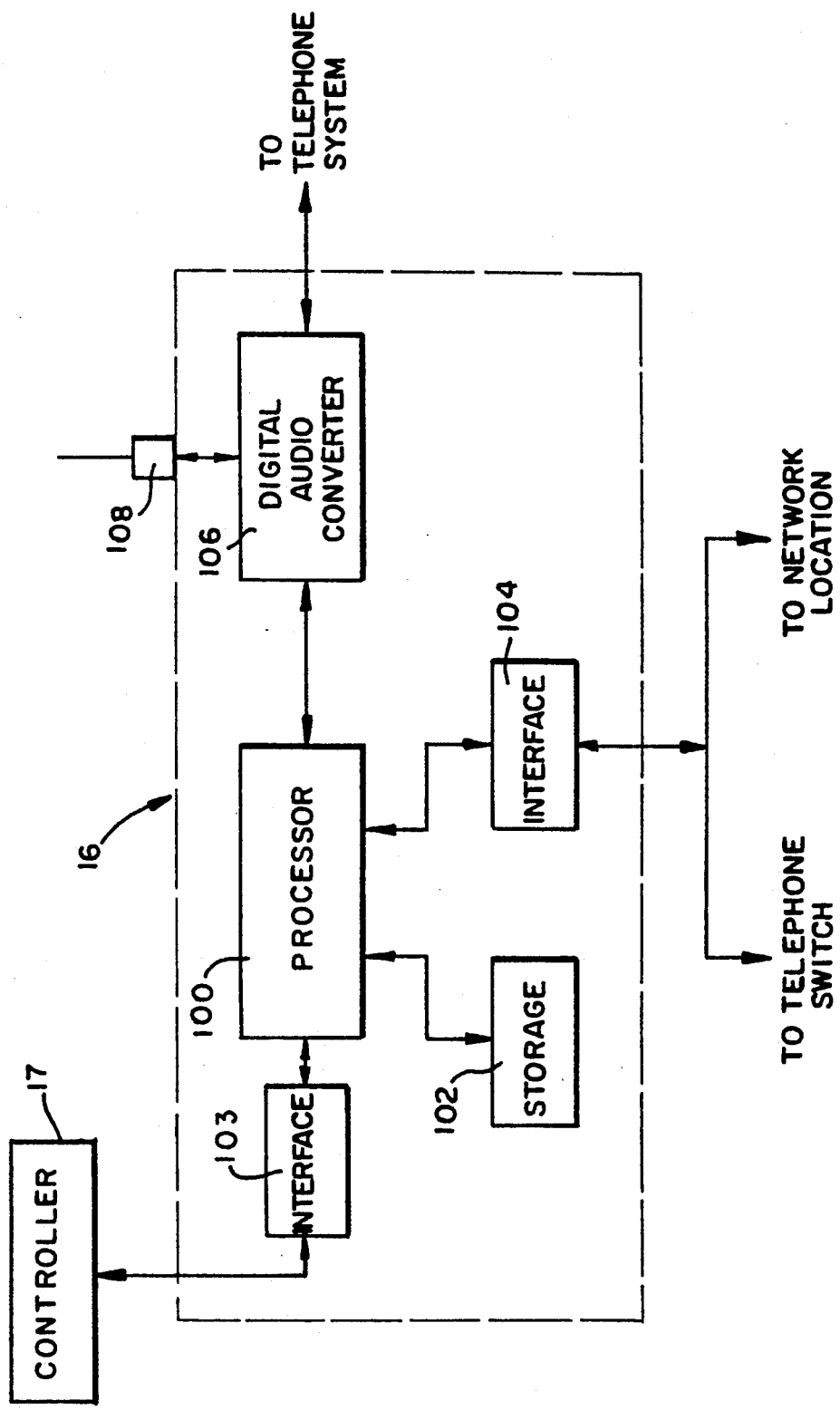
FIG. 2 is a schematic block diagram of a message generator located within the telephone marketing system of FIG. 1.

Referring specifically to FIG. 2, there is shown a block diagram depicting the internal components of a preferred embodiment of a message generator 16. Each message generator 16 comprises a processor or microprocessor 100 for processing the stored announcements and transmitting the announcements to a calling party through the telephone network. In the preferred embodiment, the microprocessor 100 is of a type which is contained in a IBM compatible personal computer. However, it is to be understood by those skilled in the art that any other type of computer or microprocessor can be used in conjunction the message generator 16. A storage device 102 is connected to the microprocessor 100 and acts as a mass storage device for storing all of the pre-recorded announcements, all associated data, as well as the software necessary for control of the message generator and for associated processing. The storage device 102 is preferably either a magnetic hard disk or an optical storage device, such as, but not limited to, a CD ROM, CD-I, or optical disk.

Data relating to a specific pre-recorded announcement is transmitted from the storage device 102 to the memory (not shown) located within the microprocessor 100 to enable processing of the announcements. The pre-recorded announcements are stored within the storage device 102 until the announcements are retrieved by the microprocessor to be transmitted to the calling party. In the preferred embodiment, the message generator also comprises a digital audio converter or card 106 and/or a video card (not shown) for containing digital pre-recorded advertisements which can be transmitted to the calling party, or if the calling party has a communication system having video capabilities, a video announcement can be transmitted from the video card.

A clock (not shown) is located within the microprocessor 100 and monitors the period of time necessary for each announcement to be played. The time is recorded and stored within the storage device 102 of the microprocessor 100. The clock is also capable of recording the period of time necessary for a sequence of messages to be played to a calling party during a particular phone call.

When an announcement or a series of announcements are to be played to a calling party, the telephone switch 18 or the ANSS 23 is connected to the microprocessor 100 via a communication interface device 104, which allows for the transfer of information to and from the message generator 16 through the telephone network. In the preferred embodiment, the communication interface is a digital data communications port (DDCP). Once the microprocessor 100 receives a signal from the telephone switch 18 or the ANSS 23, an announcement is retrieved from the storage device 102. The digitally stored announcement is transmitted to the digital audio converter 106 which converts the digital signals into an audio announcement. The audio announcement, once processed, is transmitted to the calling party located at the first telephone 12. An interface jack 108 is connected to the digital audio converter 106 to permit audio announcements to be converted to digital format for storage within the storage device 102.

The microprocessor 100 is also connected to a main controller 17 via a communication interface 103, such as a modem, and acts as a main processing system for all of the message generators located within the communication system. The main controller 17 is capable of logging each announcement which is played to a calling party into its data files. In the preferred embodiment, the controller 17 records the announcement's file name, play time, geographical area in which the announcement has been played and the billing charge for the played announcement. It is to be understood by those skilled in the art, that the main controller 17 can store any information which is considered to be pertinent to the system's billing and processing requirements. The main controller acts as the central recordkeeping and billing location.

Figure 3:
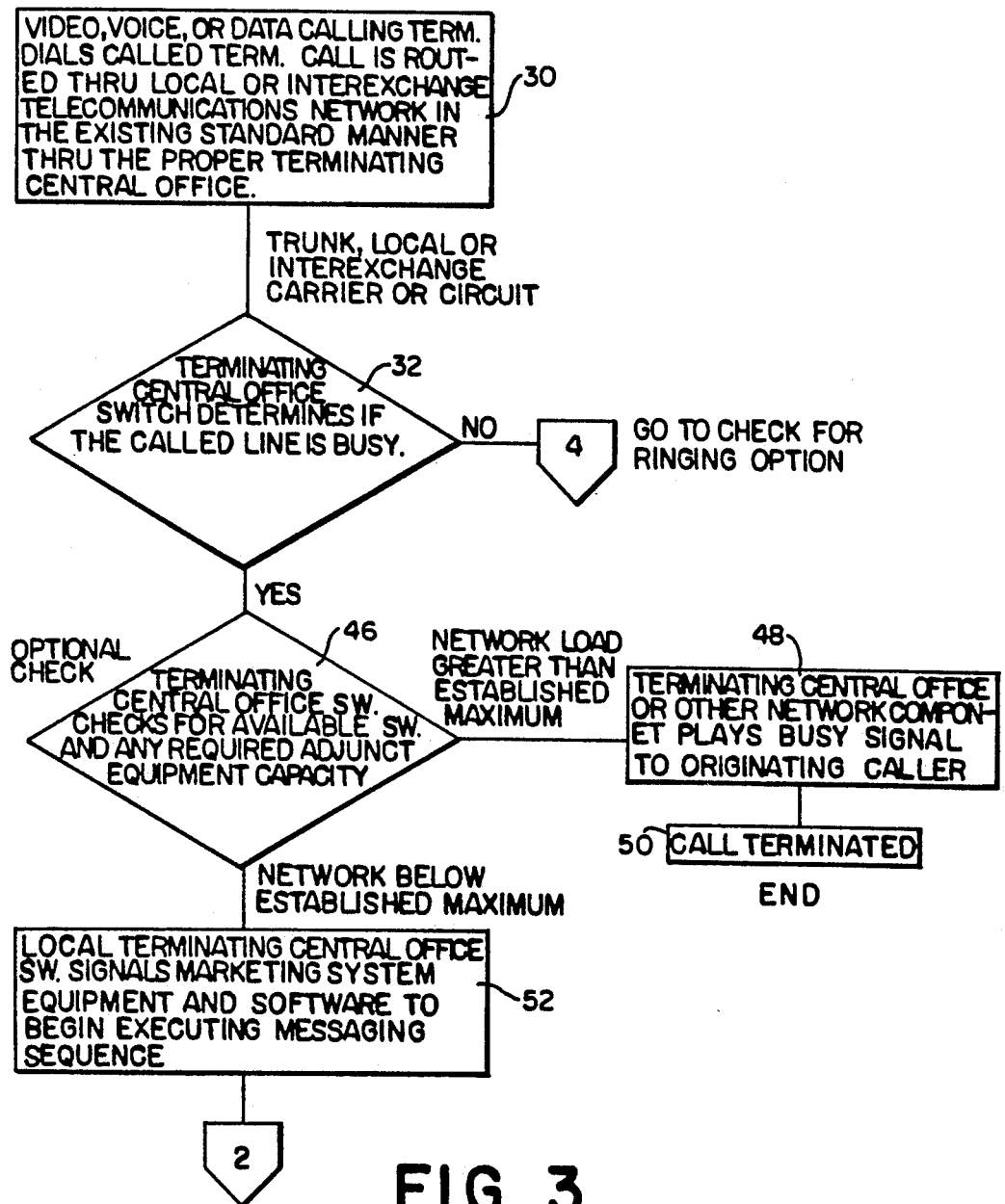
FIGS. 3–8 are flow charts of the call handling procedure of the telephone marketing system of FIG. 1 and its interaction with the telephone network call handling procedures.
Figure 4:
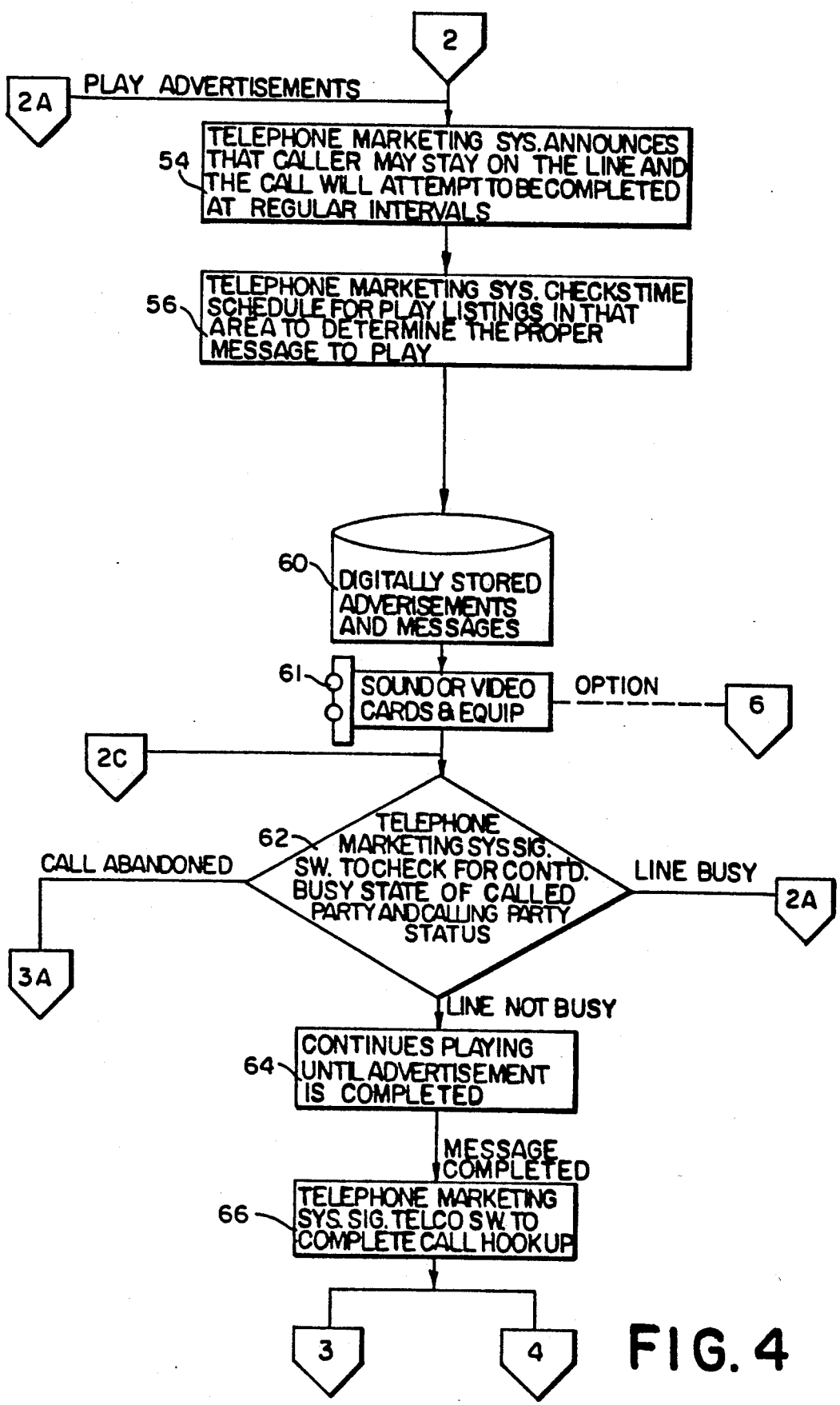
Figure 5:
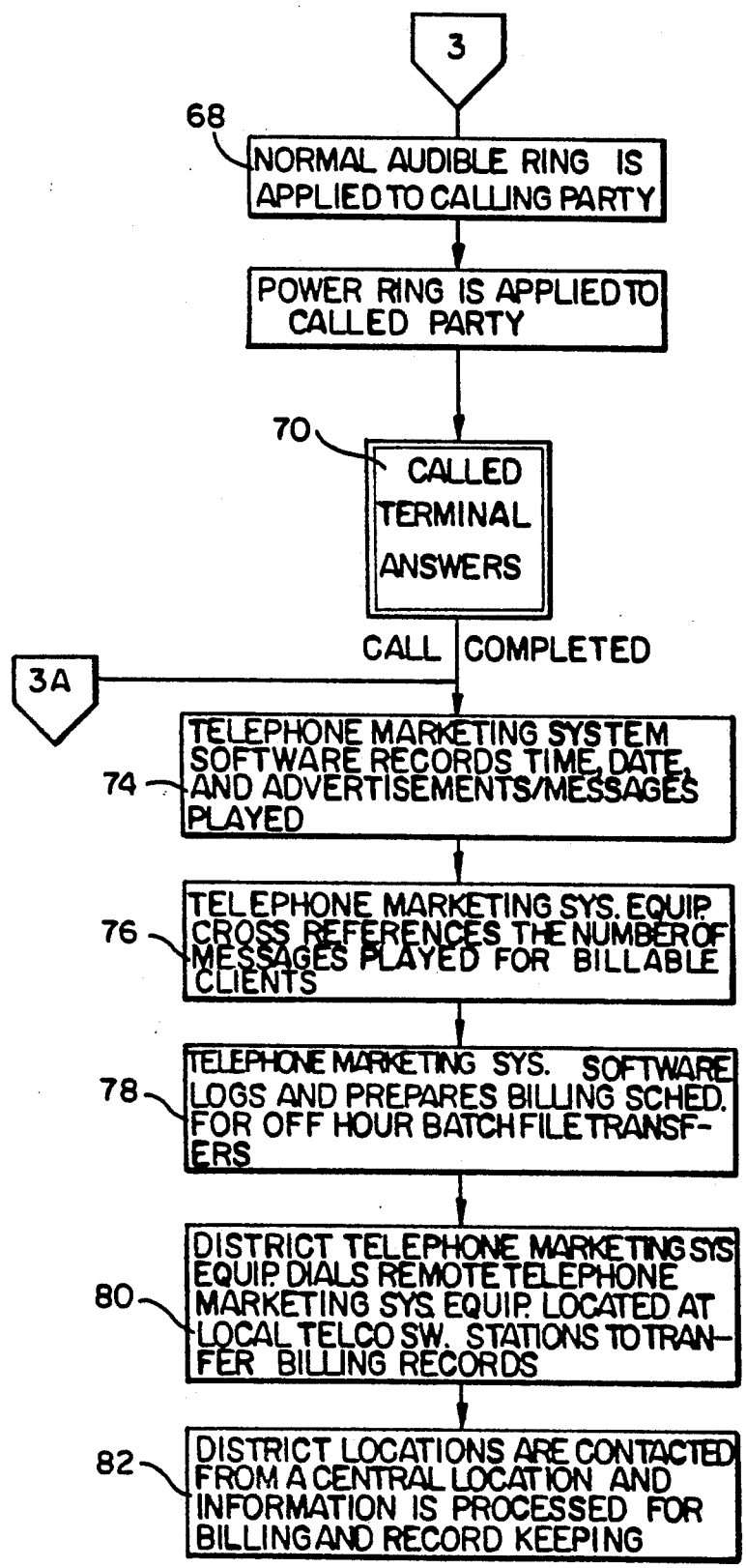
Figure 6:
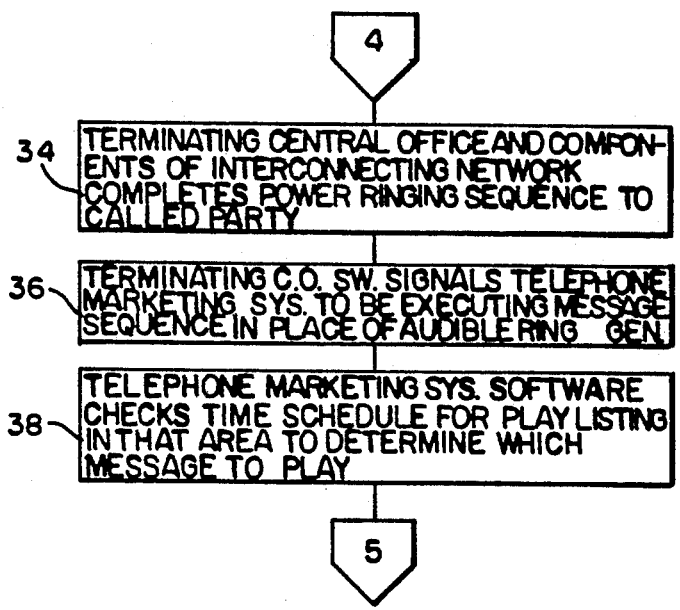
Figure 7:
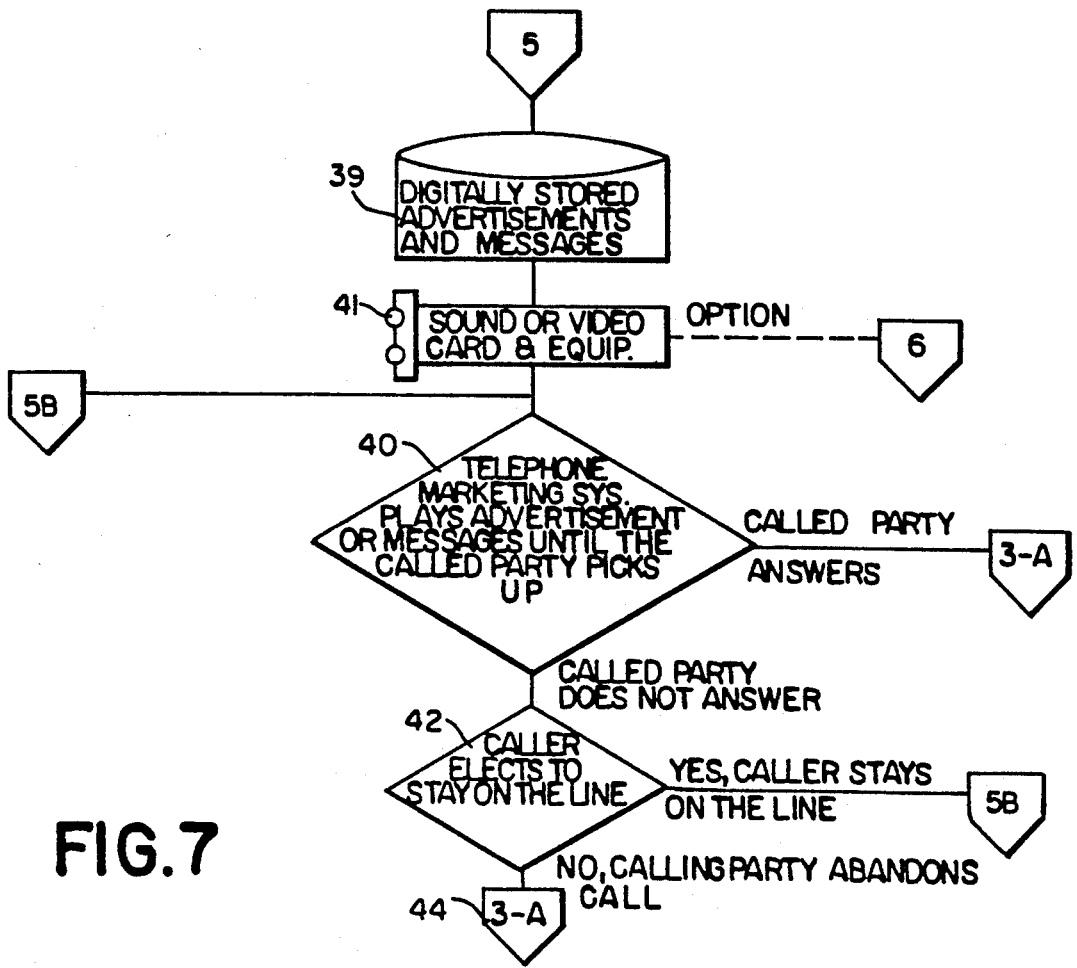

Referring specifically to FIGS. 3-8, there is shown a flow chart diagram depicting call handling procedures which can be performed by the telephone marketing system 10 in accordance with the present invention. Referring specifically to FIG. 3, a call is received from a first telephone 12 located at a first location via a local or interexchange telecommunications network to a first central office 15 at block 30. The called station's switch 22 located at a second local central office 21 receives the incoming call and it or the ANSS 23 determines the initial of the second telephone 20 of the identified called station at block 32. If the second telephone is idle, the telephone marketing system 10 initiates a sequence of prerecorded announcements as illustrated in FIGS. 6 and 7.

The second switch 22 located at the second local central office 21 or an ANSS 23 switches on a message generator 16 at block 36. The message generator 16 plays at least one prerecorded announcement over the telephone line to the calling party at the first telephone 12 at block 40. In the preferred embodiment, the prerecorded announcements are played in predetermined segments of time. Each segment of time comprises a number of short messages and/or advertisements which are digitally stored within the telephone marketing system 10 and are designed to fill a 5-30 second time span. It is to be understood by those skilled in the art that the time frame for each segment of time is arbitrary and that the announcements can be played in any predetermined segment of time. The message generator 16 determines the type of announcements and the duration in which the announcements are to be played at block 38.

As discussed above, the announcements to be played are determined by comparing information, such as the telephone exchange of the calling party or the time of day, to a look up table located within the message generator to determine which messages are to be played. The commencement of the playing of the announcements is illustrated in FIG. 7. Once the playing format is determined in block 38, the digitally stored announcements are retrieved from the memory of the message generator 16 at block 39. The information is translated to audio and/or video signals at block 41.

Once the announcements are retrieved from memory, the message generator 16 plays a series of announcements to the calling party at the first telephone 12 at block 40. If the second telephone 20 is answered, the message generator enters a completed call sequence which is illustrated in FIG. 5 beginning at 3A and which will be described hereinafter. If the second telephone 20 is not answered, the telephone system 10 through switch 18 or an ANSS 23 determines if the calling party is still off-hook on the first telephone 12 at block 42. If the calling party is still off-hook on the first telephone 12, the message generator returns to 5B and repeats the steps described in blocks 40 and 42. If the calling party has abandoned the call, the message generator 16 enters a completed call sequence which is illustrated in FIG. 5 beginning at 3A and which will be described hereinafter.

Referring now to FIG. 3, if the second telephone 20 is initially determined to be busy at block 32, i.e., the second telephone 20 is in use, then the switch 22 at the second local central office 21 or an ANSS 23 determines whether there is enough network capacity available to activate the telephone marketing system 10 to prevent a network overload at block 46. If the current network load is greater than the established maximum network load, then the switch 22 or an ANSS 23 instructs the audible signal generator 14 to generate a standard busy signal as shown at block 48. The calling party abandons the call by disconnecting the first telephone 12 and the call is terminated as shown at block 50. If the current network load is determined to be less than the established maximum network load at block 46, the switch 22 or the ANSS 23 suspends call processing for a predetermined period of time and activates the message generator 16 to initiate a sequence of prerecorded announcements at block 52 as further illustrated in FIG. 4.

In the preferred embodiment, the message generator 16 first instructs the calling party to remain on the telephone 12 and informs the calling party that the call to the second telephone 20 will be attempted to be completed at regular intervals at block 54. Communication messages are passed between the message generator 16 and the network's call processing software system to determine the current status of the second telephone 20. Simultaneously, the message generator 16 determines the type of announcements that should be played and the duration in which they will be played at block 56. The message generator 16 then preferably generates digitally stored advertisements and/or messages to the calling party at the first telephone 12 for a predetermined period of time at block 60. It is to be understood by those skilled in the art that any type of advertisement and/or message can be generated by the message generator 16. The information is translated to audio and/or video signals at block 61. When the predetermined time period has expired, the switch 22 or the ANSS 23 resumes call processing to determine whether the second telephone 20 is still busy at block 62. If the second telephone 20 is still busy, call processing is again suspended for a predetermined period of time and the switch 22 or the ANSS 23 notifies the message generator to return to 2A and repeat the steps in blocks 54–62. A sequence of additional announcements are played to the calling party at the first telephone 12 and call processing to the second telephone 20 is again retried within a predetermined period of time. If the second telephone 20 is not busy as determined by switch 22 or the ANSS 23, the switch 22 or the ANSS 23 notifies the message generator 16 to continue to play its announcements until it reaches completion of its current announcement (block 64) and then signal to switch 22 or the ANSS 23 to complete call processing to the second telephone 20 at block 66. The message generator then proceeds to the ringing and call completion sequence as shown in FIG. 5 or the call completion sequence as shown in FIG. 6.

Referring specifically to FIG. 5, once the second telephone 20 is determined to be idle, the switch 22 initiates a power ring which will cause telephone 20 to ring by applying the appropriate voltage and current to the line between telephone 20 and switch 22. Once the identified called station answers the call by lifting the receiver of the second telephone 20 at block 70, the calling process is completed. At the completion of the call, the message generator 16 enters a call completion sequence and records the time, date and the type of announcements which have been played in the memory of the microprocessor 100 at block 74. Internal software in the message generator 16 cross-references the number of announcements played to the calling party at the first telephone 12 to the party which is sponsoring each of the announcements at block 76. In the preferred embodiment, the sponsoring party can be an advertiser or some other type of a billable or non-billable client. Next, the message generator 16 provides a billing schedule for determining the amount in which the sponsoring party should be charged at block 78. In the preferred embodiment, the message generator 16 is also capable of dialing to or be dialed by remote computing equipment (not shown) in order to transfer billing records so that the appropriate sponsoring party can be billed at block 80. In an alternative embodiment, regional computing equipment which receives billing records from remote message generators can connect with central computing equipment for central billing and processing at block 82.

Referring specifically to FIG. 6, there is shown an alternative call completion sequence after the encountering of an initial busy condition. Once the telephone marketing system 10 signals switch 22 or the ANSS 23 to resume call processing as shown in block 66, the second switch 22 initiates the power ringing sequence to the called station at the second telephone at block 34. Next the switch 22 at the second local central office 21 or the ANSS 23 signals to the message generator 16 to begin executing announcements at block 36. The message generator 16 then determines the announcement sequence to be played at block 38. The playing of the announcement sequence is shown in FIG. 7 and has been described above and will not be discussed further.

The telephone network through which the party is calling can be an intelligent network, i.e., a network which utilizes advanced signaling techniques or a network having automated number identification (ANI) or a network having integrated services digital network (ISDN) capabilities. The previously described attached network signaling system 23 in this embodiment is part of intelligent network or ISDN capabilities. Automatic number identification or equivalent is a feature of a local exchange, interexchange or long distance network which passes the area code and telephone number of the telephone of the calling party into the network where it is then available for processing. Services, such as ISDN, are an array of new equipment, protocols, facilities and services, which, when implemented, allow for certain advanced telecommunication capabilities. The message generator 16 can interact with the intelligent network via existing service nodes which are well-known in the art and will not be discussed further. By connecting the message generator 16 to the intelligent network, the message generator 16 is capable of utilizing many of the services available within the intelligent network as shown in FIG. 8 and will be described as follows.

Figure 8:
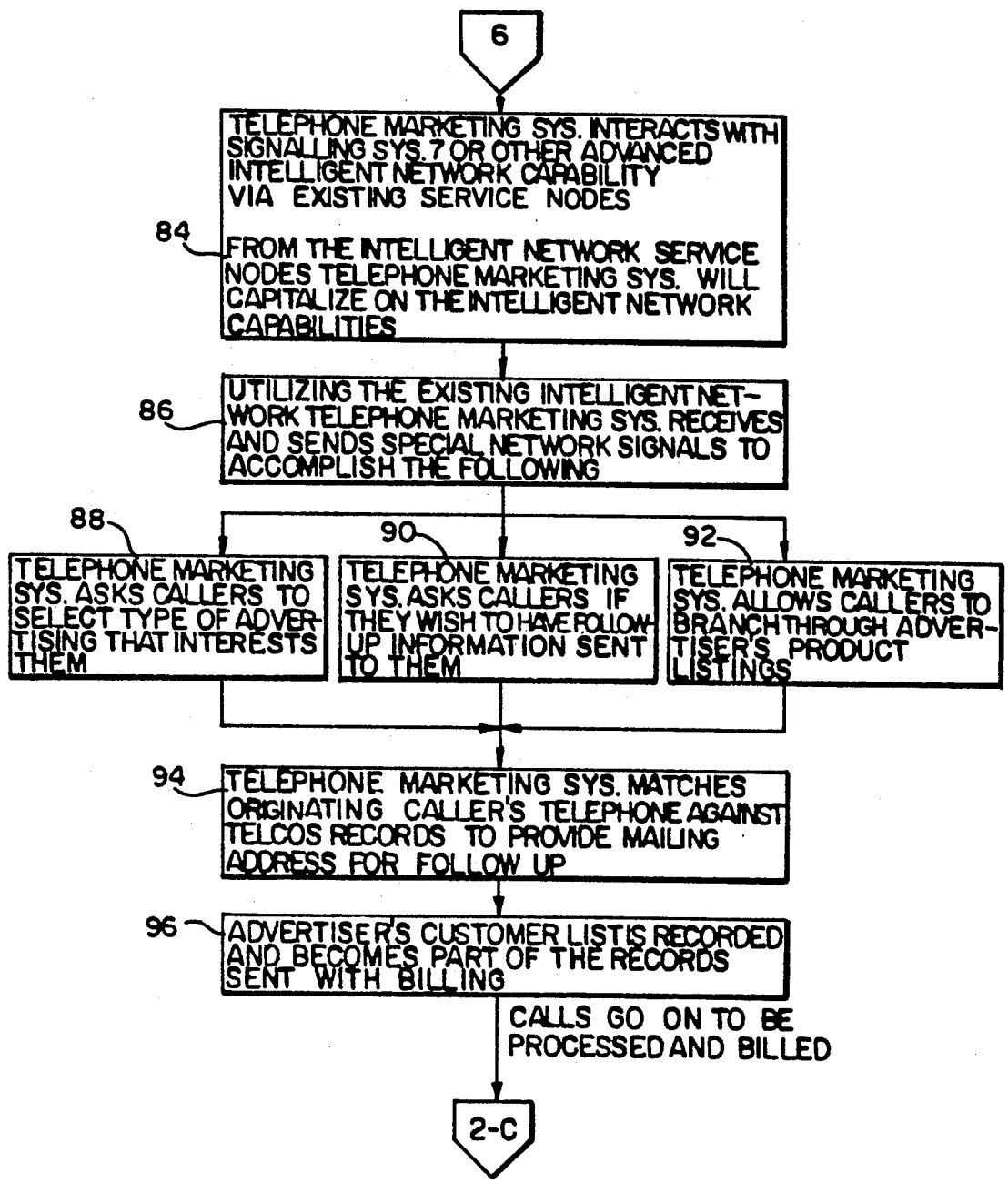

The message generator 16 receives and sends network signals using the existing intelligent network to accomplish various functions at block 86 (FIG. 8). The message generator 16 is capable of interacting with the calling party so that, for example, the calling party can obtain additional information relating to a particular announcement or select different types of advertising at block 88. At the appropriate prompt provided by the message generator 16, a calling party could respond either by voice or by pushing the appropriate buttons on a standard touch tone phone or by pressing a key on a keyboard to a computer or employ a touch screen or any other device capable of transmitting and receiving signals. Once the message generator 16 detects the assertion of a given prompt by the calling party, the microprocessor 100 identifies the telephone number of the calling party using ANI or equivalent, and connects the calling party to a third party which can provide additional information. The telephone number of the additional party is obtained by retrieving the telephone number from a look up table located within the memory of the microprocessor 100. Once the telephone number of the third party is obtained, the message generator 16 interacts with the telephone network to enable the connection of the calling party to the third party. For example, if the announcement relates to a sale at a particular retail store, the calling party can be connected to the retail store automatically to obtain additional information. It is to be understood by those skilled in the art that additional information can be obtained for any announcement which is played provided that an appropriate prompt is initiated by the message generator. If a calling party decides to obtain additional information relating to a particular announcement, the calling party is permanently disconnected from the original call and must redial the original called station at a later point in time. Alternatively, the message generator can provide upon a given prompt by the calling party a recording of the telephone number of the third party, who can provide additional information. The phone number of the third party is identified by referring to a look up table located within the memory of the microprocessor 100.

In an additional embodiment, the calling party can receive additional information by providing the mailing address of the calling party to the message generator 16. One method is for the calling party to respond to an offer of additional information by providing a given prompt. The message generator then requests the calling party's name and address so that additional information can be provided. The calling party provides a name and address which is recorded in the memory of the message generator 16. The name and address of the calling party and the request for additional information is transferred to the identified third party for further processing, such as a follow-up call or mailing of printed information. In an alternative embodiment, the message generator 16 is capable of identifying the ANI or equivalent of the calling station when the message generator 16 receives a given prompt. Once the ANI of the calling station is identified, the ANI is compared to a reverse telephone directory located within the memory of the microprocessor 100 or the controller 17 from which the name and address of the calling station is retrieved. The name and address of the calling station is transmitted to the identified third party for further processing.

The types of advertisements or messages which can be directed to the calling party can refer to certain types of business machines, certain communication systems, or the products manufactured and/or sold, or services provided by a particular corporation. It is to be understood by those skilled in the art, that the advertisements can be of any particular subject matter and are not restricted to those mentioned above. The message generator 16 is also capable of inquiring if the calling party wishes to be sent follow up information at block 90. If the calling party answers in the affirmative, the message generator 16 can record the name and address or fax number of the calling party and establish a customer mailing list therefrom. The calling party responds to the message generator 16 by either pushing a specified button on the face of the telephone if the calling party is using a touch tone telephone or a keyboard if the calling party is attached to a computer, or a voice activated response which would be transmitted to a device capable of recognizing and recording the calling party's response for later processing. The message generator can also provide calling parties with a directory type service whereby a calling party could browse through an advertiser's product listings at block 92. Such a service would be advantageous if a sponsoring party produced or manufactured a large number of products. Along with the listing, a caller could have the capability to request additional information, such as, but not limited to prices and quantity. As discussed above, if the calling party wishes to obtain additional information, the calling party can assert a given prompt to cause the message generator to connect the calling party to a third party.

If the address of the calling party is not identified during the announcement sequence, the message generator 16 is capable of matching the originating telephone 12 of the calling party with the records of the sponsoring party to provide a mailing address for a follow up response at block 94. If the telephone network has ANI or equivalent capabilities, the system can immediately identify the calling station by its identification number, i.e., its telephone number. In addition, the message generator 16 can provide a recorded customer list at block 96 which can become a permanent part of the sponsoring party's records and be included along in billing invoices.

It is to be noted that at the completion of any option of the telephone marketing system 10, the system 10 can monitor the status of the call through switch 18 or the ANSS 23, determine billing, and record relevant data about the advertisements which were played as described in blocks 74-80 of FIG. 5 which have been described previously.

From the foregoing description, it can be seen that the present invention comprises a telephone marketing system for selectively modifying an existing telephone network by replacing at least a portion of an audible call progress signal generated by the telephone network by a prerecorded announcement and by modifying a portion of the existing call processing software of the telephone network. It will be appreciated by those skilled in the art that changes could be made to the embodiment described above without departing from the broad inventive concept thereof. It is understood, therefore, that this invention is not limited to the particular embodiment disclosed but it is intended to cover all modifications which are within the scope and spirit of the invention as defined by the appended claims.

We claim:

1. A marketing system for selectively modifying an existing telephone network by modifying a portion of the call processing software of the existing telephone network and by replacing at least a portion of an audible call progress signal including either a busy signal or a ringback signal generated by the telephone network by a generally continuous prerecorded announcement, the system comprising:

means for placing a telephone call by a calling party at a first telephone;

means for connecting the telephone call to an identified called station at a second telephone having a particular calling status;

means for initially determining the busy/idle status of the second telephone, said determining means thereafter checking the busy/idle status of the second telephone at predetermined intervals prior to completion of the call;

means for playing at least one generally continuous announcement to the calling party for a predetermined period of time during a time period when an audible call progress signal would have been provided to the calling party, said playing means determining the announcement to play based upon criteria established exclusively by the marketing system and independently of the identity of the called station; and means for terminating the playing of the announcement and completing the call to the called station, in the case of the second telephone having an initial idle status, said announcement terminating and call completing means completing the call when the second telephone is answered and, in the case of the second telephone having an initial busy status, said announcement terminating and call completing means completing the call when the status of the second telephone changes to an idle status and the second telephone is thereafter answered.

2. A system according to claim 1, wherein if the second telephone has an initial idle status, said announcement is preceded by a single audible ringback signal.

3. A system according to claim 1, wherein if the second telephone has an initial busy status, said announcement is preceded by a single audible busy signal.

4. A system according to claim 1, further comprising selecting means for allowing said calling party to select a type of announcement to be played.

5. A system according to claim 1, wherein said telephone network includes at the calling party location a video terminal connected to the network and capable of receiving video messages transmitted through the network.

6. A system according to claim 1, wherein said playing means can play a sequence of announcements, wherein said system repeatedly generates additional announcements at predetermined intervals until said second telephone is answered or said calling party disconnects said first telephone and abandons the telephone call.

7. A system according to claim 1, wherein said announcement is digitally stored within said playing means.

8. A system according to claim 1, wherein said telephone network is an interexchange network.

9. A system according to claim 1, wherein said telephone network is a local exchange network.

10. A system according to claim 1, wherein said telephone network is a long distance network.

11. A system according to claim 1, further comprising interaction means for permitting the calling party to interact with said announcement during the playing of the announcement by initiating a predetermined response.

* * * * *

(12) EX PARTE REEXAMINATION CERTIFICATE (7368th)
United States Patent
Gregorek et al.

(10) Number: US 5,321,740 C1
(45) Certificate Issued: Feb. 16, 2010

(54) TELEPHONE MARKETING SYSTEM

(75) Inventors: Mark R. Gregorek, Mahwah, NJ (US); Jeffrey C. Dillow, Sparta, NJ (US)

(73) Assignee: Greenville Communications, LLC, Greenville, MI (US)

Reexamination Request:
No. 90/010,206, Jun. 23, 2008

Reexamination Certificate for:
Patent No.: 5,321,740
Issued: Jun. 14, 1994
Appl. No.: 07/718,080
Filed: Jun. 20, 1991

(51) Int. Cl.
*H04Q 3/00* (2006.01)
*H04M 3/487* (2006.01)
*H04M 19/00* (2006.01)
*H04M 3/48* (2006.01)
*H04M 19/02* (2006.01)
*G05G 9/00* (2006.01)
*G05G 9/047* (2006.01)

(52) U.S. Cl. ............... 379/88.22; 379/100.06; 379/257; 379/381; 379/88.2; 379/93.17

(58) Field of Classification Search .............. None
See application file for complete search history.

(56) References Cited

U.S. PATENT DOCUMENTS

| 4,468,528 A | 8/1984 | Reece |
| 4,577,067 A | 3/1986 | Levy |
| 4,809,321 A | 2/1989 | Morganstein |
| 5,007,077 A | 4/1991 | Fields |
| 5,150,399 A | 9/1992 | Yasuda |

FOREIGN PATENT DOCUMENTS

| JP | 45-13847 | 5/1970 |
| JP | 58-173951 | 10/1983 |
| JP | 62-136952 | 6/1987 |

*Primary Examiner*—James Menefee

(57) ABSTRACT

A marketing system selectively modifies an existing telephone network by modifying a portion of the call processing software of the existing telephone network and by replacing at least a portion of an audible call progress signal generated by the telephone network by a prerecorded announcement. A calling party places a telephone call at a first telephone to a second telephone having a particular calling status. Once the call is made, a switch or an associated network signaling system determines the busy/idle status of the second telephone. In place of the usual ringback or busy signal, an announcement indicates to the calling party the status of the second telephone and a series of announcements are played for a predetermined period of time. During the announcements, the system continues to determine the status of the telephone line of the second telephone. The announcements are played until the call is completed or abandoned.

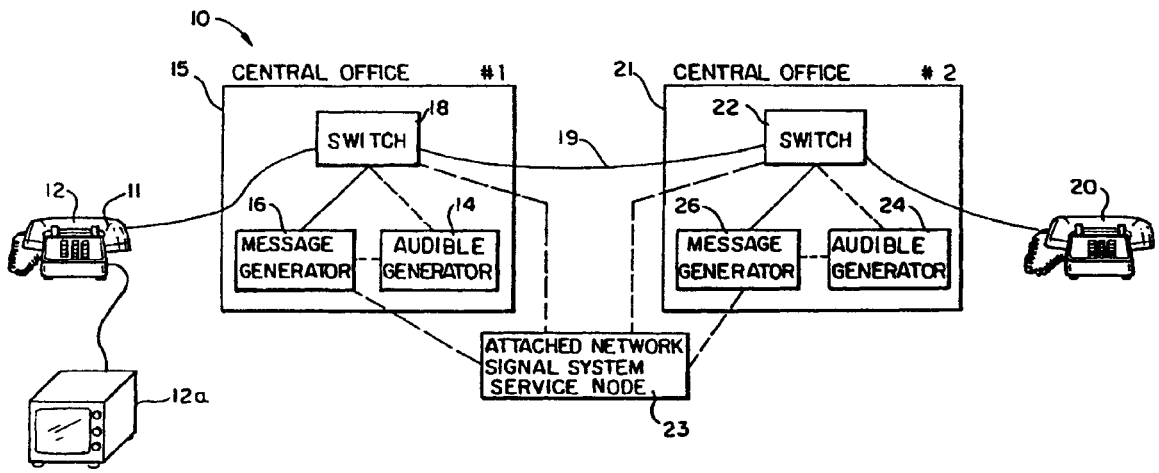

US 5,321,740 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim(s) 1–4 and 6–11 is confirmed.

New Claim(s) 12–35 are added and determined to be patentable.

12. The system of claim 1, wherein the telephone network is connected to a video display terminal configured to transmit video signals.

13. The system of claim 1, wherein the means for determining the busy/idle status of the second telephone comprises an attached network signaling system (ANSS) which is configured to instruct an audible signal generator or notify a switch of a central office to instruct the audible signal generator to transmit the audible call progress signal.

14. The system of claim 1, wherein the criteria comprises a time of day, a day of week, a month of year, an area code and a telephone exchange of the calling party.

15. The system of claim 1, wherein the announcement is a live announcement.

16. The system of claim 1, wherein the system is configured to play the announcement to fill a 5 to 30 second time span.

17. The system of claim 1, wherein the system is configured to play the announcement until completed.

18. The system of claim 11, wherein the interation means is configured to provide a voice interaction.

19. The system of claim 13, wherein the means for playing at least one generally continuous announcement comprises a message generator whch is connected to the switch.

20. The system of claim 13, wherein the ANSS is configured to monitor a current network load to determine whether there is enough network capacity available to activate the marketing system.

21. The system of claim 19, wherein the message generator comprises the audible signal generator.

22. The system of claim 19, wherein the message generator is located at the ANSS.

23. The system of claim 19, wherein the message generator comprises a video card configured to transmit a video announcement.

24. The system of claim 19, wherein the message generator comprises a clock configured to monitor the period of time necessary for the announcement to be played.

25. The system of claim 19, wherein the message generator comprises a controller which records the announcement's file name, play time, geographical area in which the announcement has been played. and billing charge.

26. The system of claim 19, wherein the message generator is configured to record a time, a date and a type of announcement.

27. The system of claim 19, wherein the message generator is configured to dial to or be dialed by a remote computing equipment to transfer billing records.

28. The system of claim 19, wherein the message generator is connected with a regional computing equipment configured to receive billing records from the message generator, the regional computing equipment being connected with a central billing computing equipment.

29. The system of claim 19, wherein the message generator is configured to connect the calling party to a third party which provides additional information regarding the announcement.

30. The system of claim 19, wherein the calling party receives additional information regarding the announcement by providing a mailing address of the calling party to the message generator.

31. The system of claim 19, wherein the message generator is configured to inquire regarding whether the calling party wishes to be sent follow up information.

32. The system of claim 19, wherein the message generator is configured to provide the calling party with a directory type service whereby the calling party browses through an advertiser's product listings.

33. The system of claim 19, wherein the message generator is configured to provide a recorded customer list which becomes a part of a sponsoring party's records and is included along in billing invoices.

34. The system of claim 20, wherein the ANSS is configured to instruct the audible signal generator to generate a standard busy signal if the current network load is greater than an established maximum network load.

35. A marketing system for selectively modifying an existing telephone network by modifying a portion of the call processing software of the existing telephone network and by replacing at least a portion of an audible call progress signal including either a busy signal or a ringback signal generated by the telephone network by a generally continuous prerecorded announcement, the system comprising:

means for placing a telephone call by a calling party at a first telephone;

means for connecting the telephone call to an identified called station at a second telephone having a particular calling status;

means for initially determining the busy/idle status of the second telephone, said determining means thereafter checking the busy/idle status of the second telephone at predetermined intervals prior to completion of the call;

means for playing at least one generally continuous announcement to the calling party for a predetermined period of time during a time period when an audible call progress signal would have been provided to the calling party, said playing means determining the announcement to play based upon criteria established exclusively by the marketing system and independently of the identity of the called station;

means for terminating the playing of the announcement and completing the call to the called station, in the case of the second telephone having an initial idle status, said announcement terminating and call completing means completing the call when the second telephone is answered and, in the case of the second telephone having an initial busy status, said announcement terminating and call completing means completing the call when the status of the second telephone changes to an idle status and the second telephone is thereafter answered;

selected means for allowing said calling party to select a type of announcement to be played; and interation means for permitting the calling party to interact with said announcement during the playing of the announcement by initiating a predetermined response, wherein if the second telephone has an initial idle status, said announcement is preceded by a single audible ringback signal, wherein if the second telephone has an initial busy status, said announcement is preceded by a single audible busy signal, wherein said playing means is configured to play a sequence of announcements, wherein said system repeatedly generates additional announcements at predetermined intervals until said second telephone is answered or said calling party disconnects said first telephone and abandons the telephone call, wherein said announcement is digitally stored within said playing means, wherein said telephone network is at least one of an interexchange network, a local exchange network and a long distance network, wherein the telephone network is connected to a video display terminal configured to transmit video signals, wherein the means for determining the busy/idle status of the second telephone comprises an attached network signaling system (ANSS) which is configured to instruct an audible signal generator or notify a switch of a central office to instruct the audible signal generator to transmit the audible call progress signal, wherein the criteria comprises a time of day, a day of week, a month of year, an area code and a telephone exchange of the calling party, wherein the announcement is a live announcement, wherein the system is configured to play the announcement to fill a 5 to 30 second time span, wherein the sytsem is configured to play the announcement until completed, wherein the interaction means is configured to provide a voice interaction, wherein the means for playing at least one generally continuous announcement comprises a message generator which is connected to the switch, wherein the ANSS is configured to monitor a currect network load to determine whether there is enough network capacity available to activate the marketing system, wherein the message generator comprises the audible signal generator, wherein the message generator is located at the ANSS, wherein the message generator comprises a video card configured to transmit a video annnouncement, wherein the message generator comprises a clock configured to monitor the period of time necessary for the announcement to be played, and wherein the message generator comprises a controller which records the announcement's file name, play time, geographical area in which the announcement has been played, and billing charge.

\* \* \* \* \*